United States Patent [19]

Collot et al.

[11] Patent Number: 5,107,407
[45] Date of Patent: Apr. 21, 1992

[54] MOTOR VEHICLE HEADLIGHT INCLUDING AN INDICATOR DEVICE FOR INDICATING THE ELEVATION DIRECTION OF ITS REFLECTOR

[75] Inventors: Patrice Collot, Pantin; Jean-Marie Brel, Claye-Souilly; Guy Dehaene, Bagnolet, all of France

[73] Assignee: Valeo Vision, Bobigny Cedex, France

[21] Appl. No.: 657,684

[22] Filed: Feb. 19, 1991

[30] Foreign Application Priority Data

Feb. 2, 1990 [FR] France ............................. 90 02027
Jul. 23, 1990 [FR] France ............................. 90 09374

[51] Int. Cl.⁵ .............................................. B60Q 1/00
[52] U.S. Cl. ......................................... 362/61; 362/66; 362/277; 362/421
[58] Field of Search ................ 362/61, 80, 66, 277, 362/427, 421

[56] References Cited

U.S. PATENT DOCUMENTS

| 4,916,583 | 4/1990 | Nagasawa | 362/61 |
| 4,922,387 | 5/1990 | Rydrer et al. | 362/80 |
| 4,984,136 | 1/1991 | Yamagishi et al. | 362/80 |

FOREIGN PATENT DOCUMENTS 8910911  9/1989  Fed. Rep. of Germany .

*Primary Examiner*—Ira S. Lazarus
*Assistant Examiner*—Sue Hagarman

[57] ABSTRACT

A motor vehicle headlight comprising a light source, a reflector, a housing, and a front glass, and also comprising an indicator device for indicating the elevation direction of the reflector, the indicator device being of the type comprising a spirit level mounted on the reflector in a plane which is essentially vertical and parallel to an optical axis defined by the reflector and being in a predetermined angular relationship with the optical axis. The spirit level is mounted on a bottom portion of the relector.

8 Claims, 3 Drawing Sheets

MOTOR VEHICLE HEADLIGHT INCLUDING AN INDICATOR DEVICE FOR INDICATING THE ELEVATION DIRECTION OF ITS REFLECTOR

The present invention relates in general to adjusting the direction in which motor vehicle headlights point.

It relates more particularly to a headlight including an indicator device for indicating the elevation direction of its reflector for the purpose of bringing the optical axis defined by said reflector into a given plane, e.g. the horizontal plane, while performing adjustment operations.

BACKGROUND OF THE INVENTION

Japanese patent application published under the number 1-173 501 discloses a headlight in which a spirit level is used to indicate the direction in which the reflector is pointing relative to the horizontal for the purpose of performing elevation adjustment on the beam. The spirit level is mounted on top of the top portion of the reflector and may be observed from the outside either through a backwardly extending overlying top portion of the closure glass, or else through a transparent window provided in the top wall of the headlight housing.

A drawback of this prior solution lies in that when the headlight is switched on, its top portion is subjected to considerable heating, in particular by convection phenomena, and as a result there is a risk of the spirit level being damaged or of the said top portion becoming warped which would then degrade the indications given by the spirit level.

The present invention seeks to provide a headlight in which the indicator device is disposed differently in order to mitigate these drawbacks.

SUMMARY OF THE INVENTION

To this end, the present invention provides a motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to an optical axis defined by said reflector and being in a predetermined angular relationship with said optical axis, wherein the spirit level is mounted on a bottom portion of the reflector.

BRIEF DESCRIPTION OF THE DRAWINGS

Embodiments of the invention are described by way of example with reference to the accompanying drawings, in which.

MORE DETAILED DESCRIPTION

Figure 1:
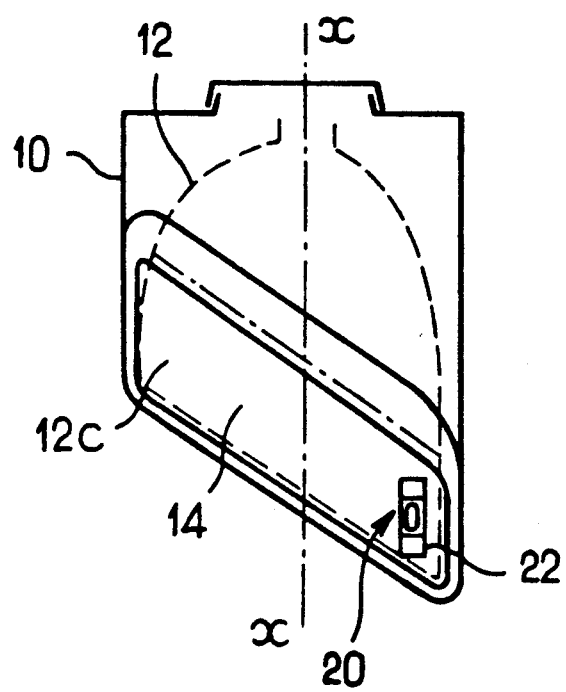
FIG. 1 is a diagrammatic plan view of a basic embodiment of the invention.

With reference initially to FIG. 1, a headlight comprises a housing 10, a reflector 12 situated inside the housing, and a glass 14 closing the front of the housing. A lamp (not shown) co-operates with the reflector to form a beam.

A spirit level 20 conventionally constituted by a transparent cylindrical tube 22 containing a liquid (not necessarily a spirit) and a bubble is mounted as explained in greater detail below on the reflector in such a manner that the axis of the tube 22 is in a well-defined angular relationship with an optical axis xx defined by said reflector. Specifically, the angular relationship may be accurate parallelism, but other relationships are also possible.

Means are also provided of entirely conventional design not described herein for the purpose of displacing the reflector 12 by pivoting it about a horizontal line extending essentially transversely to its optical axis, thereby varying the elevation angle of said optical axis and of the generated beam.

When it is desired to adjust the reference position of the reflector so as to bring its optical axis into a determined plane (horizontal in the present example) the means for displacing the reflector are actuated while observing the spirit level 20 until the spirit level indicates that the desired horizontal direction has been obtained.

According to an essential aspect of the invention, the spirit level 20 is fixed on the bottom portion 12c of the reflector in such a manner as to be capable of being observed through the front portion of the glass 14. In order to prevent the spirit level 20 constituting an obstacle to beam formation by masking part of the beam, it may be housed in a recess or the like formed in said bottom portion 12c.

The spirit level may be fixed to the reflector either permanently or else removably. If removably fixed, then the spirit level indicator device may be offered as an option.

When removably fixed, care is taken to ensure that the connection between the reflector and the spirit level (or an appropriate intermediate support) is made in such a manner as to ensure that the required angular relationship between the spirit level and the optical axis of the reflector is obtained both reproducibly and accurately.

In order to make it easier to observe the spirit level from outside the headlight, a zone having no stripes or only a few stripes may be provided in the glass 14 so as to minimize optical deformation in the observation. It should be observed that there is generally no great difficulty in providing such a zone in modern headlights since at least a portion of the beam width is imparted by the reflector itself so that overall the glass is striped very little or only slightly.

However, in some cases, it may be desirable to retain complete freedom in the design of the glass 14. Two variant embodiments are now described with reference to FIGS. 2 and 3 which make this possible. In these figures, items or parts that are identical or similar to those of FIG. 1 are designated by the same references and are not described again.

Figure 2:
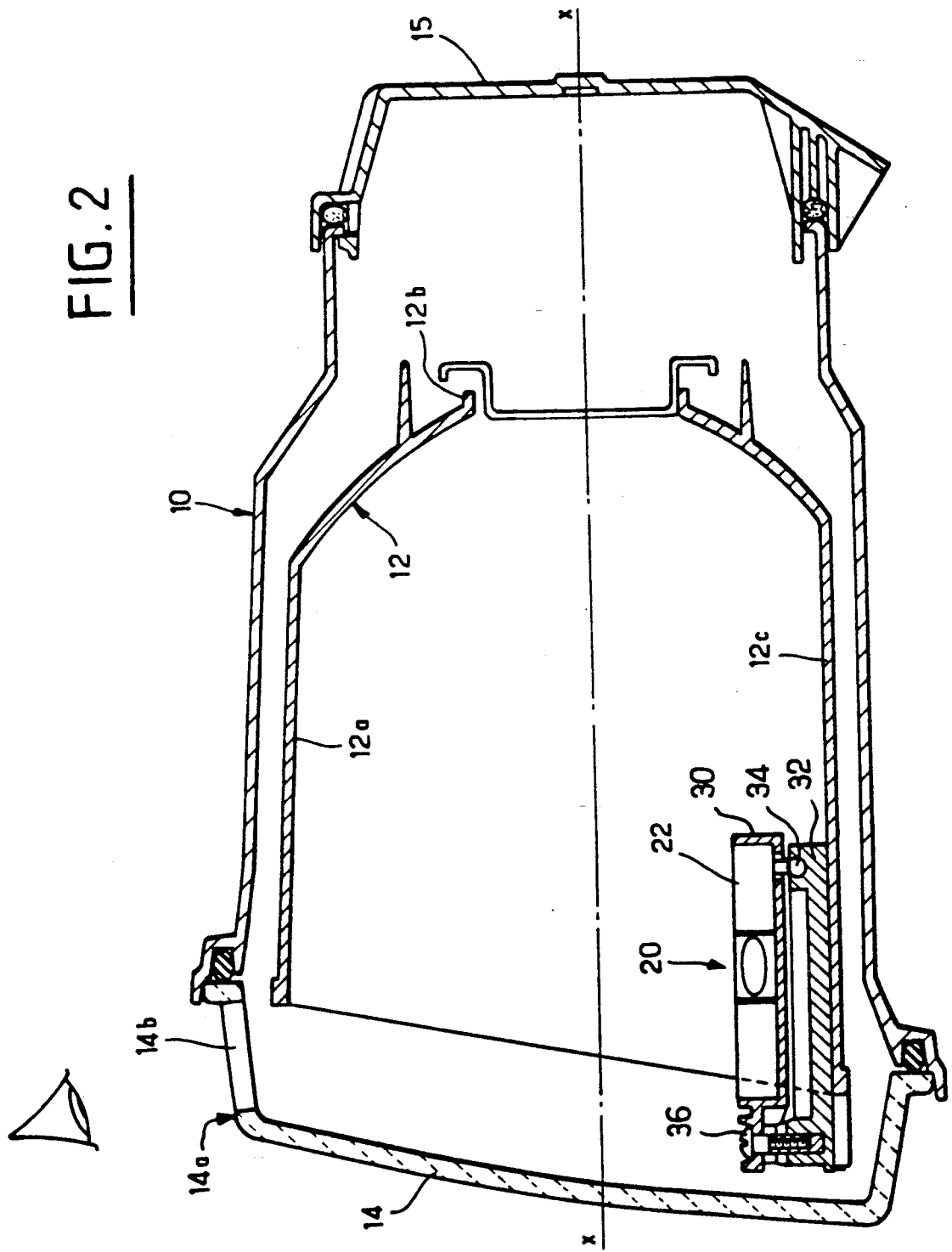
FIG. 2 is an axial vertical section through a first variant headlight of the invention.

With reference now to FIG. 2, references 12a and 12c designate respectively the top and bottom portions of the reflector. The housing is closed to the rear by a cap 15.

In conventional manner, the glass 14 includes a rim enabling it to bear against the front edge of the housing via a sealing gasket. The top portion of the rim of the glass is designated by reference 14a.

A spirit level 20 having a transparent tube referenced 22 is mounted in the front of the bottom portion 12c of the reflector, and the axis of the spirit level extends longitudinally.

In this example, it should be observed that the spirit level is mounted on the reflector at a slope which is adjustable. The spirit level is fixed to a cradle 30 having a spherical head 34 at its rear end engaged in a complementary housing formed in a support 32 itself fixed to the bottom portion 12c of the reflector.

The front end of the cradle has a hole for an adjustment screw 36 which extends essentially vertically and which is screwed into at tapped bore formed immediately therebelow in the support 32.

It will be understood that the angle between the optical axis xx and the axis of the spirit level 20 can be varied by turning the screw 36 with a screwdriver.

This adjustable mount for the spirit level makes it possible in practice to accommodate possible variations in shape and size from one reflector to another when the reflectors are molded in large quantities. This adjustment is preferably performed by placing the reflector in a calibration apparatus in which the reflector can be positioned in such a manner that it is certain that is axis xx extends along a suitable direction, e.g. by means of appropriate photoelectrical sensors. While the reflector is held in this position, the screw 36 is adjusted so that the bubble in the spirit level 20 lies between its reference marks.

In this first embodiment, the bubble may be observed during final adjustment performed after the headlight has been mounted on a vehicle by looking through an observation window 14b formed in the top rim portion 14a of the glass. In one solution, this top rim portion 14a is striped over its entire extent so as to look the same as the front portion of the glass which is striped in conventional manner, with the window 14b being defined by a region of the top rim portion 14a which has no stripes so as to enable the spirit level 20 to be observed without distortion.

Another solution consists in making the entire top rim portion 45 smooth, in which case the observation window 14b is defined by all of said portion 14a.

Figure 3:
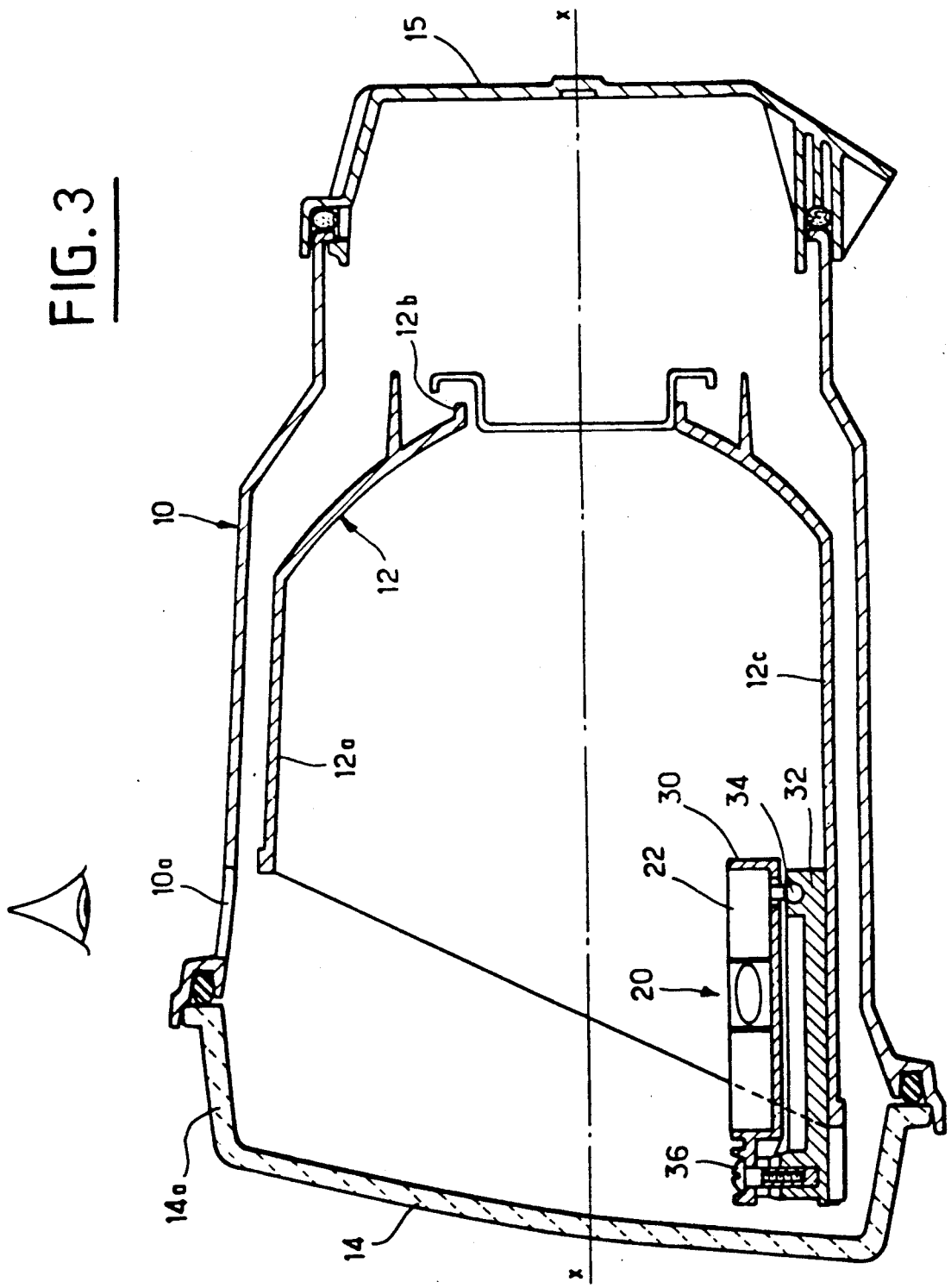
FIG. 3 is an axial vertical section through a second variant headlight of the invention.

A second variant is described with reference to FIG. 3 which differs from FIG. 2 in that the spirit level observation window is no longer formed in the glass, but in a region of the top wall of the housing 10 situated in front of the top portion 12a of the reflector (to the left in the figure). This window is designated by reference 10a.

The spirit level 20 and its mount as described above may either be provided on a permanent basis on the reflector, or else they may be provided temporarily whenever an adjustment is to be performed.

When mounted permanently, the spirit level may be disposed as shown, or else it may be received in a downwardly extending depression formed in the bottom portion 12c so as to avoid masking light rays reflected by the reflector.

When mounted temporarily, removable mounting means are provided between the bottom portion 12c of the reflector and the support 32, which means are designed to enable these two items to be positioned relative to each other in reproducible manner.

Naturally, the present invention is not limited to the embodiments described above and shown in the drawings, and the person skilled in the art will be able to provide variants and modifications thereto within the scope of the following claims.

We claim:

1. A motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to an optical axis defined by said reflector and being in a predetermined angular relationship with said optical axis, wherein the spirit level is mounted on a bottom interior portion of the reflector.

2. A headlight according to claim 1, in which the front glass includes a spirit level observation window.

3. A headlight according to claim 2, in which the observation glass has a rim and the observation window is provided in a portion of the top of the rim.

4. A headlight according to claim 3, in which the window is constituted by a non-striped region of said portion of the top of the rim, with the remainder of said top of the rim being striped.

5. A headlight according to claim 3, in which the window is constituted by all of said top portion of the rim, which top portion of the rim is not striped.

6. A headlight according to claim 1, in which the headlight housing includes a spirit level observation window in a region of a top wall of the housing situated in front of a top portion of the reflector.

7. A headlight according to claim 1, in which the spirit level is mounted at an adjustable angle relative to the said bottom portion of the reflector.

8. A headlight according to claim 7, in which the spirit level is fixed on a cradle which is itself mounted on a support which is fixed on said bottom portion of the reflector, the cradle being mounted on the support via a ball and socket and an adjustment screw at a distance from the ball and socket.

* * * * *

UNITED STATES PATENT AND TRADEMARK OFFICE
CERTIFICATE OF CORRECTION

PATENT NO. : 5,107,407
DATED : April 21, 1992
INVENTOR(S) : Patrice Collot, Jean-Marie Brel, Guy Dehaene It is certified that error appears in the above-identified patent and that said Letters Patent is hereby corrected as shown below:

<u>Title Page</u>

In the Section entitled "Foreign Application Priority Data", delete "Feb. 2, 1990" and insert--Feb. 20, 1990--.

Signed and Sealed this

Tenth Day of August, 1993

Attest:

MICHAEL K. KIRK

*Attesting Officer*   *Acting Commissioner of Patents and Trademarks*